(12) United States Patent
Cho

(10) Patent No.: US 12,427,997 B2
(45) Date of Patent: Sep. 30, 2025

(54) APPARATUS AND METHOD FOR CONTROLLING A SLIPPAGE RATE OF A VEHICLE

(71) Applicants: HYUNDAI MOTOR COMPANY, Seoul (KR); KIA CORPORATION, Seoul (KR)

(72) Inventor: Woon Ki Cho, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 34 days.

(21) Appl. No.: 18/604,690

(22) Filed: Mar. 14, 2024

(65) Prior Publication Data

US 2025/0136121 A1    May 1, 2025

(30) Foreign Application Priority Data

Nov. 1, 2023 (KR) .................. 10-2023-0149316

(51) Int. Cl.
| | |
|---|---|
| B60W 30/02 | (2012.01) |
| B60W 30/188 | (2012.01) |
| B60W 40/06 | (2012.01) |
| B60W 40/064 | (2012.01) |
| B60W 40/068 | (2012.01) |
| B60W 40/10 | (2012.01) |
| B60W 40/13 | (2012.01) |

(52) U.S. Cl.
CPC ............ *B60W 40/10* (2013.01); *B60W 30/02* (2013.01); *B60W 40/06* (2013.01); *B60W 40/064* (2013.01); *B60W 40/068* (2013.01); *B60W 40/1005* (2013.01); *B60W 40/13* (2013.01); *B60W 2300/185* (2013.01); *B60W 2520/26* (2013.01); *B60W 2552/40* (2020.02)

(58) Field of Classification Search
CPC ............ B60W 30/02; B60W 30/18172; B60W 30/188; B60W 40/06; B60W 40/064; B60W 40/10; B60W 40/1005; B60W 40/13; B60W 2300/185; B60W 2520/26; B60W 2552/40
USPC .................................................. 701/82, 90
See application file for complete search history.

(56) References Cited

U.S. PATENT DOCUMENTS

| | | | |
|---|---|---|---|
| 4,964,045 A | 10/1990 | Iwata | |
| 2009/0112437 A1* | 4/2009 | Luehrsen | B60W 30/188 701/84 |
| 2014/0018987 A1* | 1/2014 | Kato | B60W 30/18 701/22 |
| 2016/0221446 A1* | 8/2016 | Suzuki | B60L 50/66 |

(Continued)

FOREIGN PATENT DOCUMENTS

| | | |
|---|---|---|
| CN | 114750762 A | 7/2022 |
| JP | 2572846 B2 | 1/1997 |

(Continued)

*Primary Examiner* — Erick R Solis
(74) *Attorney, Agent, or Firm* — Lempia Summerfield Katz LLC

(57) ABSTRACT

An apparatus for controlling a slippage rate of a vehicle includes: a vehicle information receiver configured to receive off-road driving information of the vehicle, a target slippage rate estimation unit configured to estimate a target slippage rate value, a wheel slippage rate section corresponding to a maximum traction coefficient, using the off-road driving information, and a storage unit configured to store the target slippage rate value.

17 Claims, 5 Drawing Sheets

(56) References Cited

U.S. PATENT DOCUMENTS

| | | | | |
|---|---|---|---|---|
| 2017/0101103 A1* | 4/2017 | Foster | .................... | A01B 63/11 |
| 2019/0111932 A1* | 4/2019 | Falconer | ......... | B60W 30/18045 |
| 2019/0263392 A1* | 8/2019 | Imamura | ............ | B60K 23/0808 |
| 2021/0078582 A1* | 3/2021 | Murase | ................. | B60W 10/08 |
| 2022/0281472 A1* | 9/2022 | Usui | ..................... | B60W 50/16 |
| 2023/0118756 A1 | 4/2023 | Hoffmann | | |
| 2023/0331212 A1* | 10/2023 | Owen | ................... | B60W 10/14 |
| 2023/0339477 A1* | 10/2023 | Laine | ............. | B60W 30/18172 |
| 2025/0002002 A1* | 1/2025 | Sallee | ................... | B60W 30/02 |

FOREIGN PATENT DOCUMENTS

| | | |
|---|---|---|
| KR | 100234861 B1 | 12/1999 |
| KR | 101912451 B1 | 1/2019 |
| KR | 20200048229 A | 5/2020 |
| KR | 20230083336 A | 6/2023 |

\* cited by examiner

APPARATUS AND METHOD FOR CONTROLLING A SLIPPAGE RATE OF A VEHICLE

CROSS-REFERENCE TO RELATED APPLICATION(S)

This application claims benefit of priority to Korean Patent Application No. 10-2023-0149316 filed on Nov. 1, 2023, the disclosure of which is incorporated herein by reference in its entirety.

BACKGROUND

1. Field

The present disclosure relates to an apparatus and method for controlling a slippage rate of a vehicle.

2. Description of Related Art

Recently, the number of people who enjoy driving on off-road surfaces such as sand, mud, gravel, and the like has been increasing. In addition, interest in off-road vehicles is on the rise, driven by a growing number of vehicle orders in numerous overseas countries where off-road surfaces dominate the country's road network.

On the other hand, there are various off-road (terrain) surfaces such as snowy roads, icy roads, sandy roads, mud roads, and the like, and may also change into road surfaces with various characteristics depending on the seasons such as spring, summer, fall, and winter. Additionally, wheel slippage frequently occurs on such off-road surfaces, and the characteristics of such slippage may vary depending on changes in the road surface.

However, the driving control t technology for each terrain mode according to the related art merely controls motor torque based on a limited predetermined mode. This control technology faces many problems as it fails to adapt to changing road surface states in various manners.

SUMMARY

An aspect of the present disclosure is to provide an apparatus and method of enabling a vehicle traveling on or off-road to cope with a wheel slip situation regardless of a type or characteristics of a terrain road surface.

In addition, another aspect of the present disclosure is to provide an apparatus and method of enabling a vehicle traveling on or off-road to implement optimal traction performance according to road surface conditions.

According to another aspect of the present disclosure, an apparatus for controlling a slippage rate of a vehicle is provided. The apparatus includes: a vehicle information receiver configured to receive off-road driving information of the vehicle; and a target slippage rate estimation unit configured to estimate a target slippage rate value and a wheel slippage rate section corresponding to a maximum traction coefficient based on the off-road driving information. Additionally, the apparatus includes a storage unit configured to store the target slippage rate value.

The target slippage rate estimation unit may be configured to estimate the target slippage rate value based on the off-road driving information when the vehicle is accelerating.

The target slippage rate estimation unit may be configured to determine whether the vehicle is in an accelerating state when a value obtained by subtracting a wheel speed from a vehicle speed is a positive number.

The target slippage rate estimation unit may be configured to repeatedly calculate a traction coefficient and a wheel slippage rate at a set time or a set interval using the off-road driving information collected by the vehicle information receiver. The target slippage rate estimation unit may be configured to estimate the wheel slippage rate section corresponding to the maximum traction coefficient from the traction coefficient information corresponding to each wheel slippage rate.

The traction coefficient may be a value calculated by dividing a wheel driving force that is calculated using the off-road driving information collected by the vehicle information receiver by wheel vertical force.

The wheel slippage rate may be calculated using the wheel speed and the vehicle speed collected by the vehicle information receiver.

The storage unit may be configured to store the target slippage rate value when the vehicle is in decelerating state.

The storage unit may be configured to store the target slippage rate value when brake is applied to the vehicle.

According to another aspect of the present disclosure, a method for controlling a slippage rate of a vehicle is provided. The method includes receiving off-road driving information of the vehicle; and estimating a target slippage rate value and a wheel slippage rate section corresponding to a maximum traction coefficient, based on the off-road driving information. The method also includes storing the target slippage rate value.

The method for controlling a slippage rate of a vehicle may further include determining whether the vehicle is in a start-off state before estimating the target slippage rate value.

Estimating the target slippage rate value is performed when the vehicle is accelerating in the start-off state.

Determining whether the vehicle is in a start-off state includes determining an acceleration of the vehicle when a vehicle speed is greater than a wheel speed.

Estimating the target slippage rate value may include: calculating a traction coefficient and a wheel slippage rate repeatedly at set times or set intervals using the off-road driving information collected by the vehicle information receiver; and estimating the wheel slippage rate section corresponding to a maximum traction coefficient from traction coefficient information corresponding to each wheel slippage rate.

The method for controlling a slippage rate of a vehicle may further include determining whether to store the target slippage rate value before storing the target slippage rate value.

Determining whether to store the target slippage rate value includes storing the target slippage rate value when the vehicle is in a decelerating state.

Determining whether to store the target slippage rate value includes storing the target slippage rate value when brakes are applied to the vehicle.

The method for controlling a slippage rate of a vehicle according to an embodiment may be stored in a non-transitory computer-readable storage medium having computer readable instruction stored thereon.

BRIEF DESCRIPTION OF DRAWINGS

The above and other aspects, features, and advantages of the present disclosure should be more clearly understood from the following taken in detailed description, conjunction with the accompanying drawings, in which.

DETAILED DESCRIPTION

Figure 1:
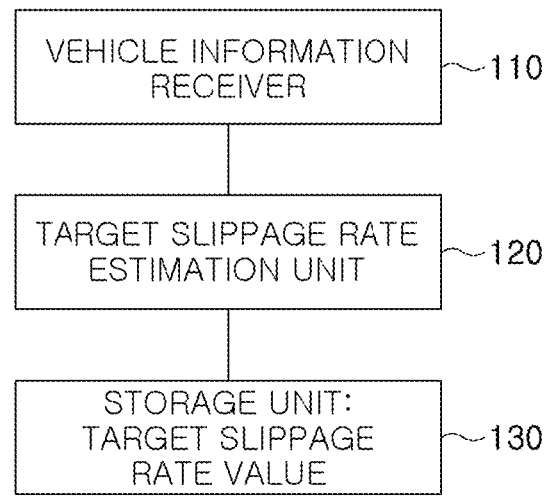
FIG. 1 is a conceptual diagram of an apparatus for controlling a slippage rate of a vehicle according to an embodiment.

Since the present disclosure may make various changes and have various embodiments, specific embodiments are illustrated in the drawings and described in detail below. However, this is not intended to limit the present disclosure to specific embodiments, and should be understood to include all changes, equivalents, and substitutes included in the spirit and technical scope of the present disclosure.

Terms such as first, second, and the like may be used to describe various components, but the components should not be limited by the terms. The above terms are used only for the purpose of distinguishing one component from another. For example, a first component may be named a second component, and similarly, the second component may also be named a first component without departing from the scope of the present disclosure. The term 'and/or' includes any combination of a plurality of related stated items or any of a plurality of related stated items.

The terms used in the present disclosure are only used to describe specific embodiments and are not intended to limit the present disclosure. Singular expressions include plural expressions unless the context clearly dictates otherwise. In the present disclosure, terms such as "comprise," "include," and "have" are intended to designate the presence of features, numbers, steps, operations, components, parts, or combinations thereof described in the specification. It should be understood that this does not exclude in advance the presence or addition of one or more other features, numbers, steps, operations, components, parts, or combinations thereof.

Unless otherwise defined, all terms used herein, including technical or scientific terms, have the same meaning as commonly understood by those having ordinary skill in the art to which the present disclosure pertains. Terms defined in commonly used dictionaries should be interpreted as having a meaning consistent with the meaning in the context of the related technology, and should not be interpreted in an idealized or excessively formal sense, unless explicitly defined in the present application.

When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer-readable media, as part of the apparatus.

In this specification, a vehicle refers to a variety of vehicles that move transported objects, such as people, animals, goods, or the like from a starting point to a destination. The vehicles are not limited to vehicles that run on roads or tracks.

Hereinafter, the embodiments are described in more detail with reference to the attached drawings.

Referring to FIGS. 1-8, an apparatus 100 for controlling a slippage rate of a vehicle or a method (S100) for controlling a slippage rate of a vehicle of an embodiment may be a slippage control logic (device or method) based on wheel driving force, wheel vertical force, and wheel slippage rate to secure maximum traction for each off-road terrain surface. According to the embodiment, the slippage rate in which maximum traction may be exerted is monitored and updated whenever wheel slip occurs regardless of the type or characteristics of the terrain road surface. Thus, an optimal traction performance may be obtained for each terrain surface.

Below, the apparatus 100 for controlling a slippage rate is described first with reference to FIG. 1, and the control method (S100) is described after.

FIG. 1 is a conceptual diagram of an apparatus for controlling a slippage rate of a vehicle according to an embodiment.

The apparatus 100 for controlling a slippage rate of a vehicle (e.g., an electric vehicle) according to the embodiment may be an auxiliary device allowing a vehicle system to select maximum traction according to a slippage rate for each road surface. Hereinafter, vehicle may refer to anything that drives on a terrain road, including electric vehicles.

A vehicle running on or off-road may control a target slippage rate section that may secure maximum traction, regardless of the type or characteristics of the terrain surface. Specifically, the vehicle's off-road oscillation data may be analyzed, the slippage rate section in which maximum traction is exerted may be estimated, and the corresponding slippage rate may be stored as a target slippage rate. Afterwards, the stored target slippage rate may be used in the vehicle's driving control.

The apparatus 100 for controlling a slippage rate of a vehicle according to an embodiment may include a vehicle information receiver 110, a target slippage rate estimation unit 120, and a storage unit 130.

In FIGS. 1-8, the control unit is omitted, but in the embodiment, a control unit controlling the apparatus 100 for controlling a slippage rate of a vehicle and the method (S100) for controlling a vehicle slippage rate may be provided, and overall control may be obtained by the control unit. For example, the control unit may be linked with the apparatus 100 for controlling a slippage rate of a vehicle. Additionally, the control unit may be linked with the vehicle information receiver 110, the target slippage rate estimation unit 120, and the storage unit 130 to participate in the control of these configurations.

Figure 2:
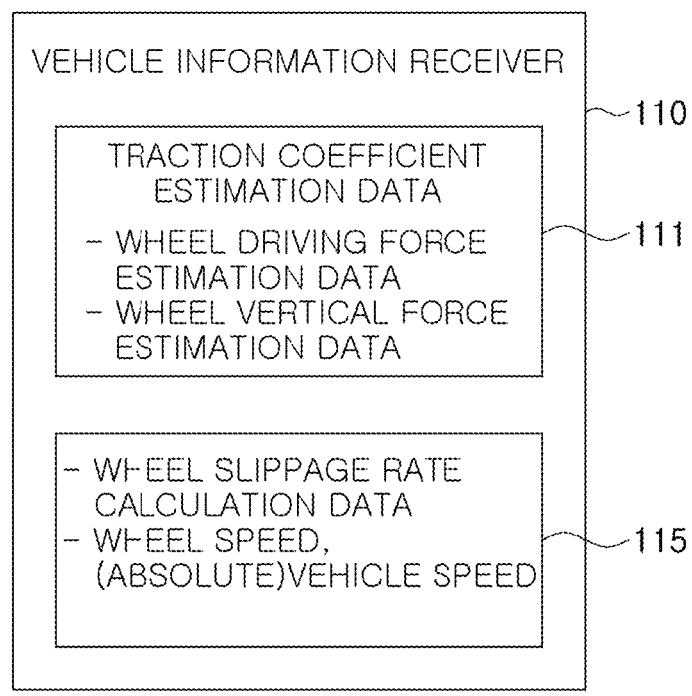
FIG. 2 is a conceptual diagram illustrating an example of a vehicle information receiver in a control device according to an embodiment.

Referring to FIG. 2, the vehicle information receiver 110 may receive (collect) necessary information from the target slippage rate estimation unit 120 and the storage unit 130 to be described below. The vehicle information receiver 110 may include a traction coefficient estimation data receiver 111 and a wheel slippage rate calculation data receiver 115.

The traction coefficient estimation data receiver 111 may include data for calculating (estimating) wheel driving force and data for calculating (estimating) wheel vertical force.

For example, to determine whether the vehicle is starting, information such as a value of an accelerator position sensor (APS), a vehicle speed, a wheel speed, and the like may be collected (received).

In addition, to calculate wheel driving force, information such as motor torque ($T_M$), reduction ratio (FGR), friction coefficient (u), wheel (tire) radius (R), drive system moment of inertia, wheel angular acceleration, and the like may be collected (received). Additionally, to estimate wheel vertical force, information, such as total axle weight ($F_z$), axle weight ($F_{Z,f}$) of the front wheels of the vehicle, axle weight ($F_{Z,r}$) of the rear wheels of the vehicle, weight ($m_b$) of the vehicle, a distance ($l_r$) from a center of gravity to a rear axle of the vehicle, a distance ($l_f$) from a center of gravity to a front axle of the vehicle, acceleration due to gravity, a height ($h_{CG}$) of the center of gravity of the vehicle, longitudinal vehicle acceleration ($ba_x$), and the like, may be collected (received).

Additionally, to calculate the wheel slippage rate, information such as vehicle speed and wheel speed may be collected.

The values of wheel torque, wheel slippage rate, and the like described above may be measured or calculated using various sensors installed in the vehicle. Such sensors include speed sensors, rotation sensors, acceleration sensors, and angular velocity sensors, and various algorithms provided in the vehicle. Tools, sensors, and methods other than those described above may be used, and there are no restrictions on measurements or calculation methods.

Figure 3:
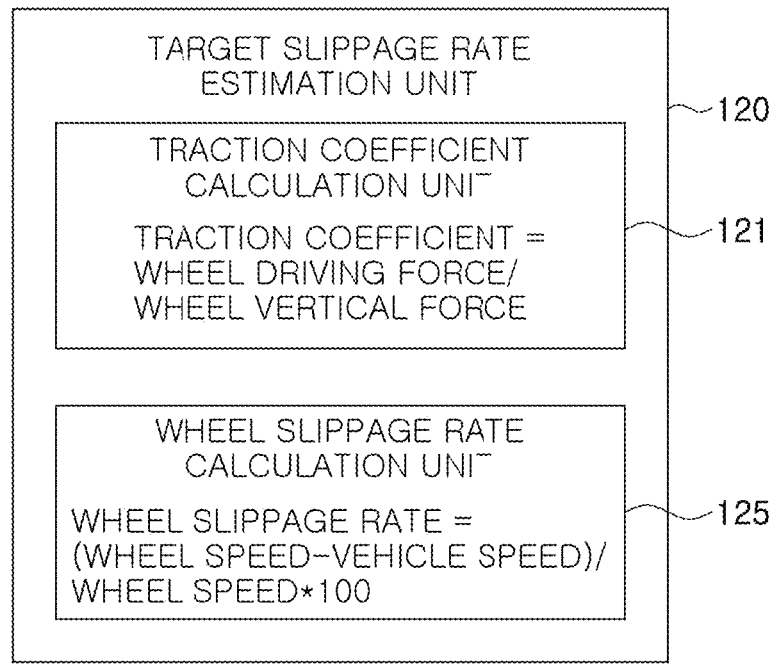
FIG. 3 is a conceptual diagram illustrating an example of a target slippage rate estimation unit in a control device according to an embodiment.

Next, referring to FIG. 3, the target slippage rate estimation unit 120 may estimate a target slippage rate value and the wheel slippage rate section corresponding to a maximum traction coefficient, based on a traction coefficient (T) calculated (estimated) in a traction coefficient calculation unit 121 and a wheel slippage rate value calculated (estimated) in a wheel slippage rate calculation unit 125.

Figure 5:
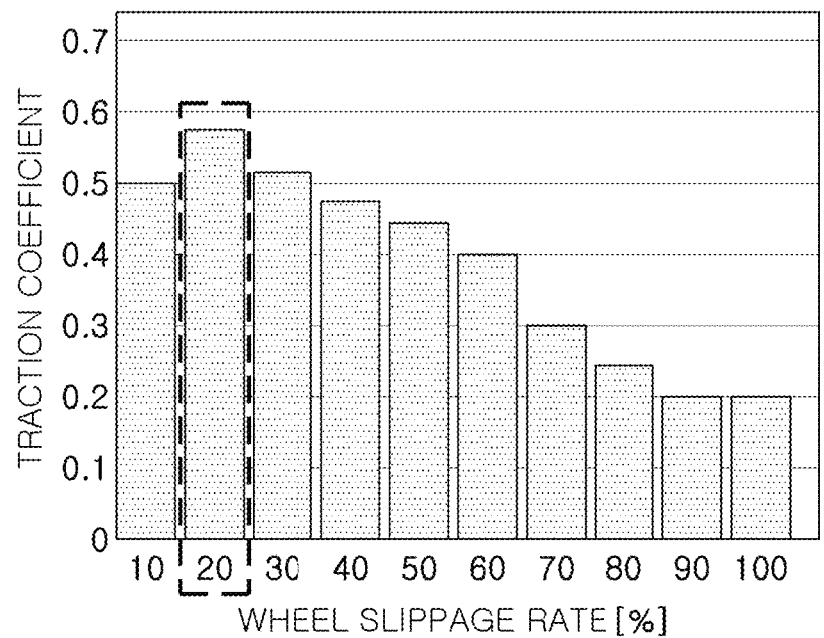
FIG. 5 is a graph illustrating an example of estimating a target slippage rate in a control device according to an embodiment.

For example, as illustrated in FIG. 5, the traction coefficient and wheel slippage rate are repeatedly calculated at set times or intervals. Additionally, by estimating the wheel slippage rate section corresponding to the maximum traction coefficient, from the traction coefficient information corresponding to respective wheel slippage rates, the corresponding wheel slippage rate section may be estimated as a target slippage rate value (approximately 20% of the dotted box in FIG. 5 is the target slippage rate value). Specifically, the apparatus calculates the part where the traction coefficient is maximized relative to the wheel slippage rate, which is repeatedly calculated when the vehicle is in a starting state. Specifically, the target slippage rate at which the vehicle's traction is maximized, may be stored.

The target slippage rate estimation unit 120 may include a traction coefficient calculation unit 121 and a wheel slippage rate calculation unit 125. Additionally, the embodiment may include a start-off determination unit determining whether the vehicle is in a start-off state. The start-off determination unit may be included in the target slippage rate estimation unit 120 or may be provided as a separate component, and may command the target slippage rate estimation unit 120 to calculate (estimate) the target slippage rate value only when the vehicle is in an oscillating state.

The start-off determination unit may determine whether the vehicle is in a start-off state. For example, a case in which it is determined that the vehicle is accelerating may be recognized as a case in which the vehicle is in a start-off state. Additionally, the start-off determination unit may determine acceleration when the vehicle speed is greater than the wheel speed. In addition, the start-off determination unit may determine that the vehicle is in an oscillating state when the value of the accelerator position sensor (APS) is a positive number, the vehicle speed is a positive number, and the vehicle speed is greater than the wheel speed.

Additionally, when the start-off determination unit determines that the vehicle is not in a start-off state, the target slippage rate estimation unit 120 may be commanded to calculate (estimate) the target slippage rate value only when the vehicle is in a start-off state by repeatedly collecting vehicle information again.

The traction coefficient calculation unit 121 may calculate (estimate) the traction coefficient (T) by estimating (calculating) the wheel driving force and wheel vertical force.

The wheel driving force ($F_{x,f}$, $F_{x,r}$) of the front and rear wheels of the vehicle may be calculated, for example, by [Equation 1] below.

$$F_{x,f} = (T_{M,f} \times FGR_f + i_f \times w_f)/R \qquad \text{[Equation 1]}$$

$$F_{x,r} = (T_{M,r} \times FGR_r + i_r \times w_r)/R$$

In Equation 1, $T_{M,f}$ is the front wheel motor torque, $FGR_f$ is the front wheel final reduction gear ratio (reduction ratio), if is the front-wheel drive system moment of inertia, $w_f$ is the front wheel angular acceleration, R is the tire dynamic diameter, $T_{M,r}$ is the rear wheel motor torque, $FGR_r$ is the rear wheel final reduction gear ratio (reduction ratio), $i_r$ is the moment of inertia of the rear-wheel drive system, and $w_r$ is the rear wheel angular acceleration.

The wheel vertical force ($F_{z,f}$, $F_{z,r}$) of the front and rear wheels of the vehicle, e.g., the axle weight, may be calculated by, for example, [Equation 2] below.

$$F_{z,f} = m_b \times \frac{l_r \times g - h_{CG} \times ba_x}{l_r + l_f} \qquad \text{[Equation 2]}$$

$$F_{z,r} = m_b \times \frac{l_f \times g - h_{CG} \times ba_x}{l_r + l_f}$$

In Equation 2, $F_{z,f}$ is the axle weight of the front wheel, $F_{z,r}$ is the axle weight of the rear wheel, $m_b$ is the weight of the vehicle, $l_r$ is the distance from the center of gravity to the rear axle, $l_f$ is the distance from the center of gravity to the front axle, g is the acceleration of gravity, $h_{CG}$ is the height of the center of gravity, and $ba_x$ is longitudinal vehicle acceleration.

Figure 4:
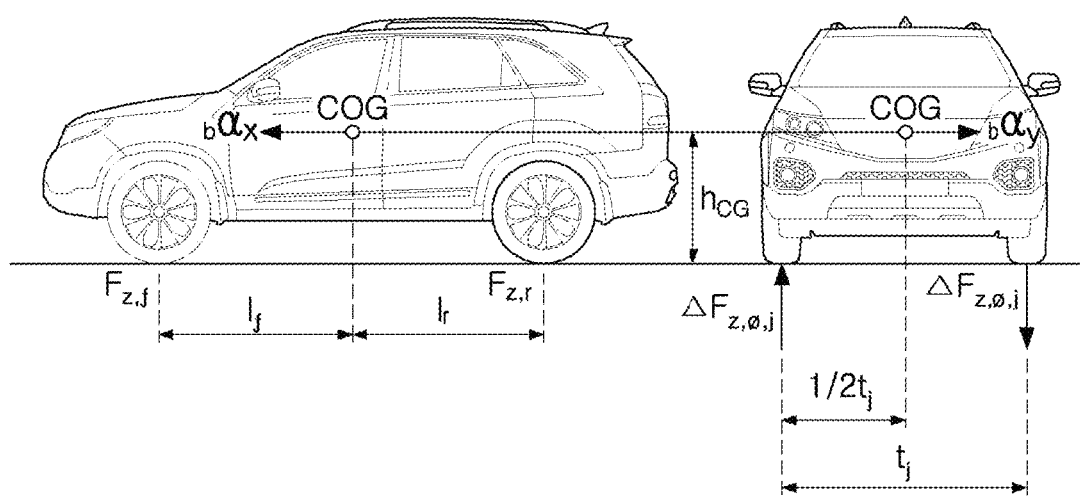
FIG. 4 is a reference diagram illustrating a method of calculating an axle weight of a vehicle according to an embodiment.

In FIG. 4, COG is the center of gravity, and bay corresponds to the lateral vehicle acceleration.

With the above information, the traction coefficient calculation unit 121 may calculate (estimate) the traction coefficients (traction coefficients, $T_{r,f}$, $T_{r,r}$) of the front and rear wheels of the vehicle using [Equation 3] below.

$$T_{r,f} = F_{x,f}/F_{z,f} \qquad \text{[Equation 3]}$$

$$T_{r,r} = F_{x,r}/F_{z,r}$$

The wheel slippage rate calculation unit 125 may calculate (estimate) the wheel slippage rates $Wr_{f,l}$, $Wr_{f,r}$, $Wr_{r,l}$, and $Wr_{r,r}$ of two front wheels and two rear wheels using the vehicle speed and wheel speed by Equation 4 below, respectively.

$$Wr_{f,l} = (V_{f,l} - V_{abs})/V_{f,l} \times 100 \quad \text{[Equation 4]}$$
$$Wr_{f,r} = (V_{f,r} - V_{abs})/V_{f,r} \times 100$$
$$Wr_{r,l} = (V_{r,l} - V_{abs})/V_{r,l} \times 100$$
$$Wr_{r,r} = (V_{r,r} - V_{abs})/V_{r,r} \times 100$$

In Equation 4, $Wr_{f,l}$, $Wr_{f,r}$, $Wr_{r,l}$, and $Wr_{r,r}$ are the wheel slippage rates of the front wheel left, front wheel right, rear wheel left, and rear wheel right, respectively. $V_{f,l}$, $V_{f,r}$, $V_{r,l}$, and $V_{r,r}$ are the wheel speeds of the front wheel left, front wheel right, rear wheel left, and rear wheel right, respectively. Additionally, $V_{abs}$ is the vehicle speed (i.e., the vehicle's absolute speed).

In this manner, for example, the target slippage rate may be selected using the traction coefficient (T) and wheel slippage rate (Wr) calculated at a fixed time or interval using Equations 1 to 4. For example, the target slippage rate estimation unit 120 may estimate a target slippage rate value and the wheel slippage rate section corresponding to a maximum traction coefficient, based on the traction coefficient (T) calculated (estimated) in the traction coefficient calculation unit 121 and the wheel slippage rate value calculated (estimated) in the wheel slippage rate calculation unit 125.

For example, as illustrated in FIG. 5, the traction coefficient and wheel slippage rate are repeatedly calculated at set times or intervals. Additionally, the wheel slippage rate section corresponding to a maximum traction coefficient may be estimated from the traction coefficient information corresponding to the respective wheel slippage rates, and the corresponding wheel slippage section may be estimated with the target slippage rate value (approximately 20%, a dotted box portion in FIG. 5, is the target slippage rate value). Specifically, the part where the traction coefficient is calculated to be the largest for the wheel slippage rate that is repeatedly calculated when the vehicle is in a start-off state, e.g., the target slippage rate where the vehicle's traction may be exerted the greatest, may be stored.

Next, the storage unit 130 may store the part where the traction coefficient is calculated to be the largest in the target slippage rate estimation unit 120, e.g., the target slippage rate where the traction of the vehicle may be exerted the greatest. Additionally, the apparatus 100 for controlling a slippage rate of a vehicle may be provided with a storage determination unit to determine whether to store the target slippage rate. The storage determination unit may be included in the target slippage rate estimation unit 120 or the storage unit 130, or may be provided as a separate configuration therefrom. Additionally, the target slippage rate value may be stored in the storage unit 130 only when the vehicle is in a predetermined state.

For example, when the vehicle is in a decelerating state, a command may be given to store the target slippage rate value in the storage unit 130. Additionally, for example, a target slippage rate value may be commanded to be stored when the brakes are applied to the vehicle. In addition, when the speed of the vehicle is a certain speed, such as 1 to 10 kph (km/h) or less (specifically, e.g., 1 km/h or less) and the brakes are applied to the vehicle, the target slippage rate value may be commanded to be stored.

On the other hand, when the storage determination unit determines that the target slippage rate value is not in a state to be stored in the storage unit 130, the target slippage rate value may be updated again by the vehicle information receiver 110 and the target slippage rate estimating unit 120. Specifically, the target slippage rate value may be updated by continuously calculating the slippage rate at which the vehicle's traction may be maximized over time. At the moment when the storage determination unit commands the storage unit 130 to store the target slippage rate value, the value corresponding to the target slippage rate value may be stored in the storage unit 130.

Next, a method (S100) for controlling a vehicle slippage rate, which may be implemented using at least a part of the apparatus 100 for controlling a slippage rate of a vehicle described above, is described.

Figure 6:
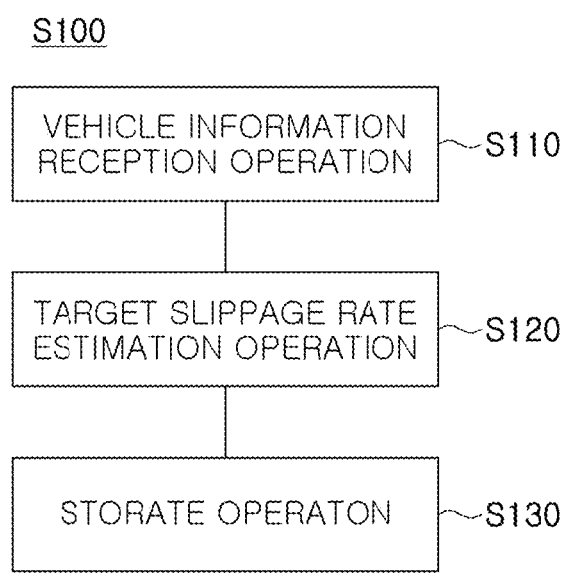
FIG. 6 is a conceptual diagram of a method for controlling a slippage rate of a vehicle according to an embodiment.
Figure 7:
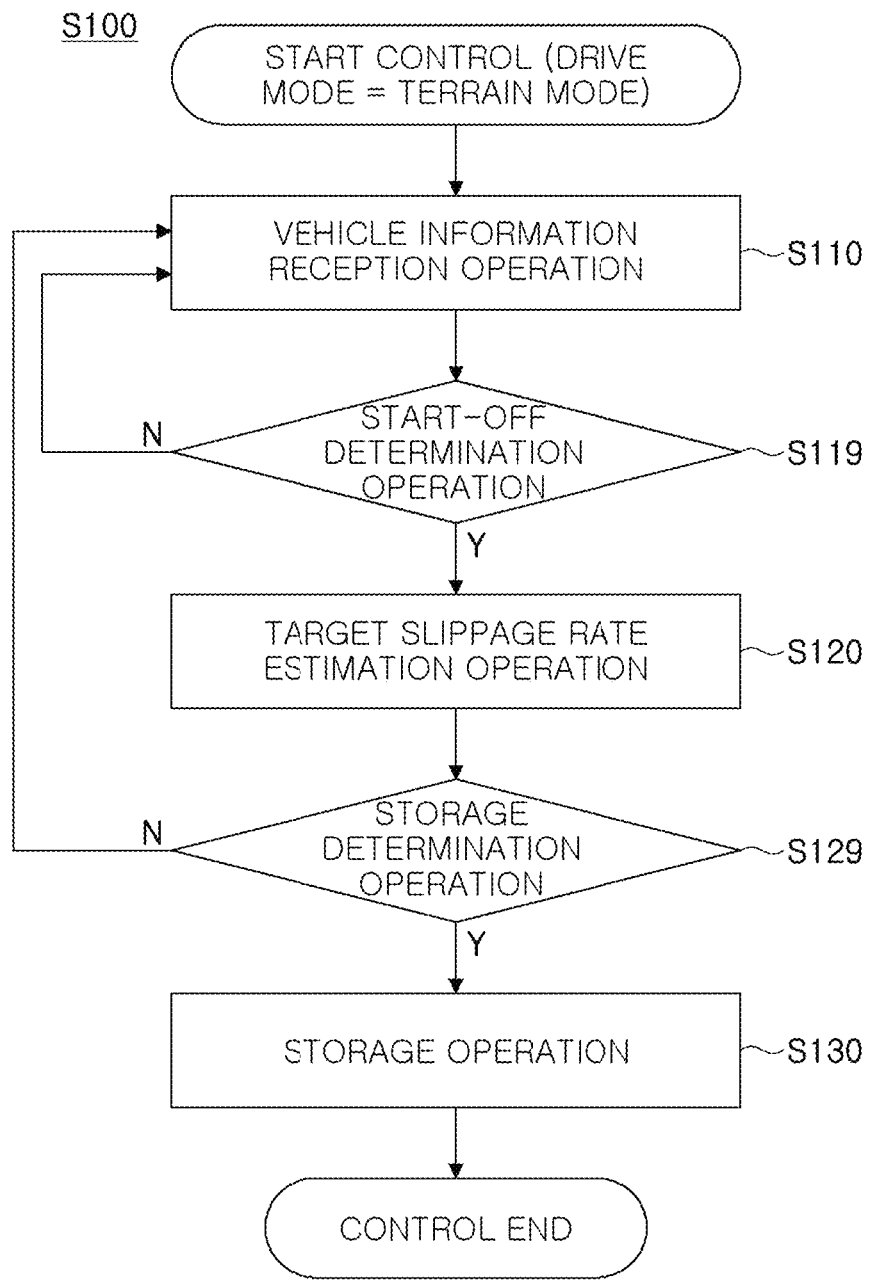
FIG. 7 is a detailed conceptual diagram illustrating a method for controlling a slippage rate of a vehicle according to an embodiment.
Figure 8:
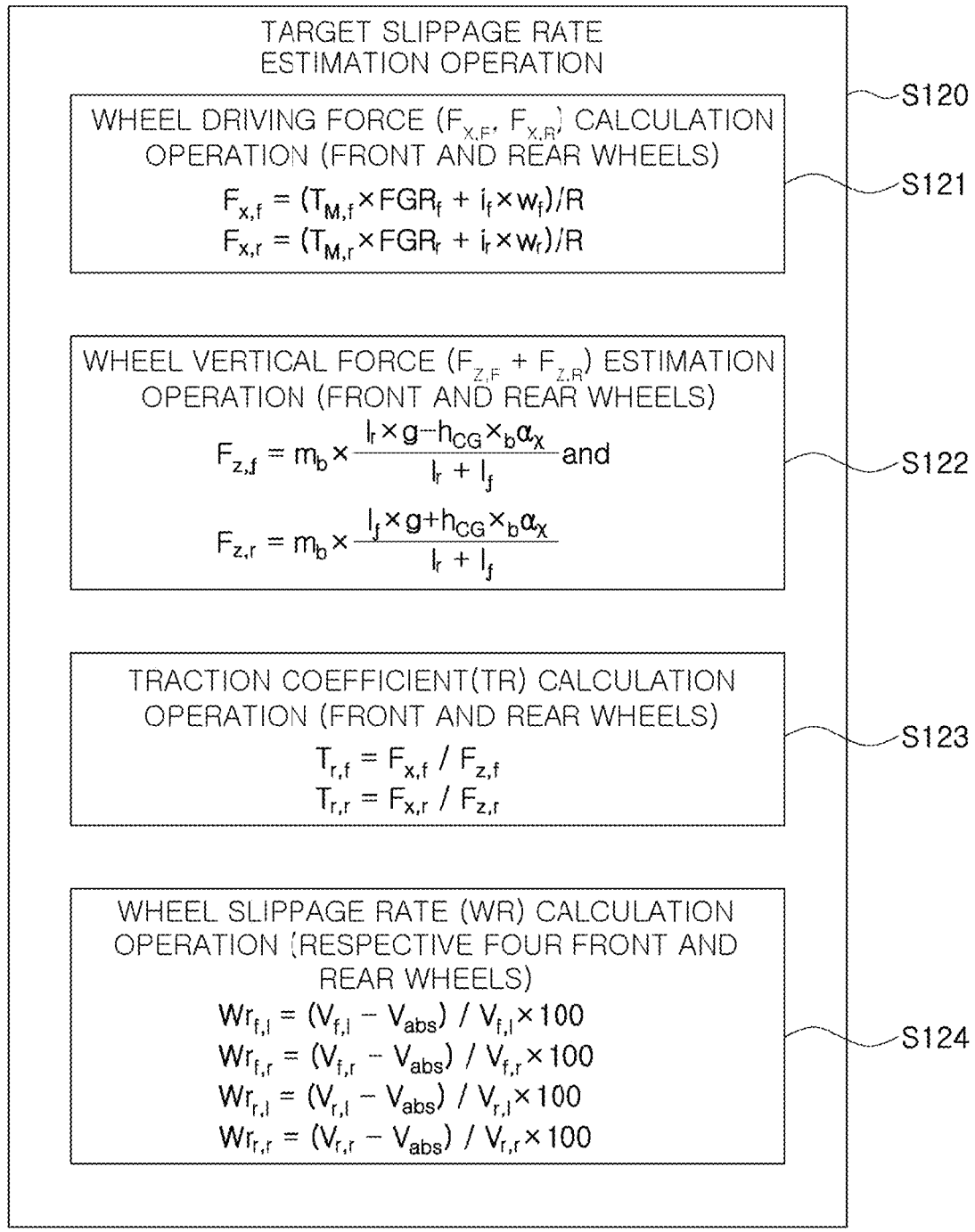
FIG. 8 is a conceptual diagram illustrating an example of a target slippage rate estimation operation in a control method according to an embodiment.

FIG. 6 is a conceptual diagram of a method for controlling a slippage rate of a vehicle according to an embodiment. FIG. 7 is a detailed conceptual diagram illustrating a method for controlling a slippage rate of a vehicle according to an embodiment. FIG. 8 is a conceptual diagram illustrating an example of the target slippage rate estimation operation in the control method according to an embodiment.

Referring to FIG. 6, the method (S100) for controlling a slippage rate of a vehicle according to an embodiment may include a vehicle information reception operation (S110), a target slippage rate estimation operation (S120), and a storage operation (S130).

In addition, referring to FIG. 7, the method (S100) for controlling a slippage rate of a vehicle may further include a start-off determination operation (S119) to determine whether the vehicle is oscillating, for example, to proceed from the vehicle information reception operation (S110) to the target slippage rate estimation operation (S120). In addition, for example, to proceed from the target slippage rate estimation operation (S120) to the storage operation (S130), a storage determination operation (S129) may be further included to determine whether or not to store the target slippage rate.

In the attached drawings, the control unit is omitted, but in the embodiment, a control unit controlling the apparatus 100 for controlling a slippage rate of a vehicle and the method (S100) for controlling a slippage rate of a vehicle may be provided, and overall control may be obtained by the control unit. For example, the control unit may be involved in controlling the method (S100) for controlling a slippage rate of a vehicle. Specifically, the control unit may be involved in the control of the vehicle information (S110), the target slippage rate reception operation estimation operation (S120), the storage operation (S130), the start-off determination operation (S119), and/or the storage determination operation (S129). The control unit may participate in the control of these configurations by linking with the vehicle information receiver 110, the target slippage rate estimation unit 120, and the storage unit 130 related to the controls thereof.

The method (S100) for controlling a slippage rate of a vehicle may be performed by the apparatus 100 for controlling a slippage rate of a vehicle described above. Additionally, respective individual operations may be performed by the vehicle information receiver 110, the target slippage rate estimation unit 120, and the storage unit 130.

The vehicle information reception operation (S110) may receive information required in the target slippage rate estimation operation (S120) and the storage operation (S130) described below. Data received in the vehicle information reception operation (S110) may include traction coefficient estimation data and wheel slippage rate calculation data. The vehicle information reception operation (S110) may be performed by the vehicle information receiver 110.

Traction coefficient estimation data may include data for calculating (estimating) wheel driving force and data for calculating (estimating) wheel vertical force.

For example, to determine whether the vehicle is starting, information such as a value of the accelerator position sensor (APS), vehicle speed, and wheel speed may be received (collected).

In addition, to calculate wheel driving force, information such as motor torque (TM), reduction ratio (FGR), friction coefficient (u), wheel (tire) radius (R), drive system moment of inertia, wheel angular acceleration and the like may be collected (received). Additionally, to estimate wheel vertical force, information, such as total axle weight ($F_z$), axle weight of front wheels of the vehicle ($F_{z,f}$), axle weight of rear wheels of the vehicle ($F_{z,r}$), weight of vehicle ($m_b$), a distance ($l_r$) from a center of gravity to a rear axle of the vehicle, a distance ($l_f$) from a center of gravity to a front axle of the vehicle, acceleration due to gravity, a height ($h_{CG}$) of the center of gravity of the vehicle, a longitudinal vehicle acceleration ($ba_x$), and the like, may be collected (received).

Additionally, to calculate the wheel slippage rate, information such as vehicle speed and wheel speed may be collected.

The values of wheel torque, wheel slippage rate, and the like described above may be measured or calculated using various sensors installed in the vehicle, such as speed sensors, rotation sensors, acceleration sensors, angular velocity sensors, and the like, and various algorithms installed in the vehicle. Tools, sensors, and methods other than those described above may be used, and there are no restrictions on measurements or calculation methods.

The target slippage rate estimation operation (S120) may include traction coefficient calculation and wheel slippage rate calculation. Additionally, the embodiment may include the start-off determination operation (S119) of determining whether the vehicle is in a start-off state. The target slippage rate estimation operation (S120) may be performed by the target slippage rate estimation unit 120.

The start-off determination operation (S119) is an intermediate operation for progressing from the vehicle information reception operation (S110) to the target slippage rate estimation operation (120). Additionally, only when the vehicle is in an oscillating state, a command may be given to proceed to the target slippage rate estimation operation (S120) and calculate (estimate) the target slippage rate value. The start-off determination operation (S119) may be performed by the control unit using information from the vehicle information receiver 110.

The start-off determination operation (S119) determines whether the vehicle is in a start-off state and may proceed to the next operation, i.e., the target slippage rate estimation operation (S120), only when the vehicle is in a start-off state (Y). For example, a case in which it is determined that the vehicle is accelerating may be recognized as a case in which the vehicle is in a start-off state. Additionally, in the start-off determination operation (S119), e.g., when the vehicle speed is greater than the wheel speed, acceleration may be determined. In addition, in the start-off determination operation (S119), e.g., when the value of the accelerator position sensor (APS) is a positive number, vehicle speed is a positive number and the vehicle speed is greater than the wheel speed, the vehicle may be judged to be in oscillation.

Additionally, when it is determined that the vehicle is not in a start-off state (N) in the start-off determination operation (S119), the vehicle information reception operation (S110) may be repeated again. For example, the vehicle information is repeatedly received again in the vehicle information reception operation (S110), and only when it is determined that the vehicle is in a start-off state based on the received information, a command may be given to proceed to the target slippage rate estimation operation (S120) and calculate (estimate) the target slippage rate value.

In the target slippage rate estimation operation (S120), the target slippage rate value may be estimated using the traction coefficient (T) calculated (estimated) in the traction coefficient calculation and the wheel slippage rate value calculated (estimated) in the wheel slippage rate calculation. The target slippage rate value is the wheel slippage rate section corresponding to a maximum traction coefficient. The target slippage rate estimation operation (S120) may be performed by the target slippage rate estimation unit 120.

For example, as described above with reference to FIG. 5, the traction coefficient and wheel slippage rate are repeatedly calculated at fixed times or intervals. Additionally, by estimating the wheel slippage rate section corresponding to the maximum traction coefficient from the traction coefficient information corresponding to each wheel slippage rate, the corresponding wheel slippage rate section may be estimated as the target slippage rate value (approximately 20%, a dotted box in FIG. 5, is the target slippage rate value). Specifically, the apparatus calculates the part where the traction coefficient is maximized relative to the wheel slippage rate, which is repeatedly calculated when the vehicle is in a start-off state. In other words, the target slippage rate at which the vehicle's traction is maximized, may be stored.

Referring to FIG. 8, the target slippage rate estimation operation (S120) may include traction coefficient calculation operations (S121, S122, and S123), and a wheel slippage rate calculation operation (S124).

The traction coefficient (T) may be calculated (estimated) by estimating (calculating) the wheel driving force and wheel vertical force.

The wheel driving force ($F_{x,f}$, $F_{x,r}$) of the front and rear wheels of the vehicle may be calculated using the above-mentioned [Equation 1].

The wheel vertical force ($F_{z,f}$, $F_{z,r}$) of the front and rear wheels of the vehicle, e.g., the axle weight, may be calculated by the above-mentioned [Equation 2].

With the above information, the traction coefficients ($T_{r,f}$, $T_{r,r}$) of the front and rear wheels of the vehicle may be calculated (estimated) using the above-mentioned [Equation 3].

In addition, the wheel slippage rates ($Wr_{f,l}$, $Wr_{f,r}$, $Wr_{r,l}$, $Wr_{r,r}$) of the two front wheels and the two rear wheels of the vehicle may be calculated (estimated) respectively, using the vehicle speed and wheel speed, by the above-mentioned [Equation 4].

In this manner, the target slippage rate may be selected using the traction coefficient (T) and wheel slippage rate (Wr) calculated at a fixed time or interval using Equations 1 to 4. For example, the target slippage rate estimation operation (S120) may estimate the target slippage rate value, which is the wheel slippage rate section corresponding to a maximum traction coefficient, using the traction coefficient (T) calculated (estimated) in the traction coefficient calculation and the wheel slippage rate value calculated (estimated) in the wheel slippage rate calculation.

For example, as illustrated in FIG. 5, the traction coefficient and wheel slippage rate are repeatedly calculated at set times or intervals. Additionally, by estimating the wheel slippage rate section corresponding to a maximum traction coefficient from the traction coefficient information corresponding to each wheel slippage rate, the corresponding wheel slippage rate section may be estimated as the target slippage rate value (approximately 20%, which is the dotted box in FIG. 5, is the target slippage rate value). Specifically, the apparatus calculates the part where the traction coefficient is maximized relative to the wheel slippage rate, which is repeatedly calculated when the vehicle is in a starting state. In other words, the target slippage rate at which the vehicle's traction is maximized, may be stored.

Next, in the storage operation (S130), the part where the traction coefficient is calculated to be the largest in the target slippage rate estimation operation (S120), i.e., the target slippage rate at which the vehicle's traction may be maximized, may be stored. In addition, the method (S100) for controlling a slippage rate of a vehicle may include a storage determination operation (S129) to determine whether to store the target slippage rate. The storage operation (S130) may be performed by the storage unit 130.

The storage determination operation (S129) is an intermediate operation to proceed from the target slippage rate estimation operation (S120) to the storage operation (S130). Only when the vehicle is in a predetermined state, a command may be given to proceed to the storage operation (S130) and store the target slippage rate value. The storage determination operation (S129) may be performed by the control unit using information from the target slippage rate estimation unit 120.

The storage determination operation (S129) determines whether the vehicle is in a predetermined state, and may proceed to the next operation, i.e., the storage operation (S130), only when applicable (Y). For example, when the vehicle is in a decelerating state, the storage operation (S130) may be performed and may command to store the target slippage rate value. Additionally, when the brakes are applied to the vehicle, a command may be given to proceed to the storage operation (S130) and store the target slippage rate value. In addition, when the vehicle's speed is set at a certain speed, e.g., 1 to 10 kph (km/h) or less, and when the brakes are applied to the vehicle, the apparatus proceeds to the storage operation (S130), and a command may be given to store the target slippage rate value.

Also, when it is determined in the storage determination operation (S129) that the target slippage rate value is not in a state to be stored in the storage unit 130 (N), the target slippage rate value may be updated again in the vehicle information reception operation (S110) and the target slippage rate estimation operation (S120). Specifically, the target slippage rate value may be updated by continuously calculating the slippage rate at which the vehicle's traction may be maximized over time. Then, the system may proceed from the storage determination operation (S129) to the storage operation (130), and at the moment of commanding to save the target slippage rate value, the storage operation (S130) may proceed.

Accordingly, in the storage operation 130, the target slippage rate, which is the target slippage rate section that may secure maximum traction, may be stored regardless of the type or characteristics of the terrain surface on which the off-road vehicle runs. Accordingly, the stored target slippage rate may be used to control the vehicle's driving on various terrain surfaces with various characteristics.

Methods according to the embodiments of the present disclosure may be implemented in the form of program instructions that may be executed through various computer means and may be recorded on a computer-readable medium. A computer-readable medium may include program instructions, data files, data structures, and the like, singly or in combination. Program instructions recorded on a computer-readable medium may be specially designed and configured for the present disclosure or may be known and available to those having ordinary skill in the art of computer software.

Examples of computer-readable media include hardware devices specially configured to store and execute program instructions, such as read-only memory (ROM), random access memory (RAM), flash memory, or the like. Examples of program instructions include high-level language code that may be executed by a computer using an interpreter, as well as machine language code, such as that produced by a compiler. The above-described hardware device may be configured to operate with at least one software module to perform the operations of the present disclosure, and vice versa.

The apparatus 100 for controlling a slippage rate of a vehicle (electric vehicle) according to an embodiment may include a storage unit. The storage unit is a recording medium suitable for storing the apparatus 100 for controlling a slippage rate of a vehicle (electric vehicle), and may include magnetic media, such as hard disks, floppy disks, and magnetic tapes, optical media such as Compact Disk Read Only Memory (CD-ROM) and Digital Video Disk (DVD), magneto-optical media, such as floptical disk, and semiconductor memories such as f flash memory, Erasable Programmable ROM (EPROM), or SSD manufactured based thereon.

The storage unit may be implemented by a non-volatile memory (not illustrated) configured to store data regarding algorithms configured to control the operation of various components of the vehicle or software instructions that reproduce the algorithms. Additionally, the storage unit may be implemented by a processor (not illustrated) configured to perform the operations described above or below using data stored in the corresponding memory. In this case, the memory and processor may be implemented as individual chips. Alternatively, the memory and processor may be implemented as a single chip integrated with each other. A processor may have the form of one or more processors.

Components of the apparatus 100 for controlling a slippage rate of a vehicle (electric vehicle) may be connected wired and wirelessly using a network provided in the vehicle, to exchange information. Of course, the method (S100) for controlling a slippage rate of a vehicle (electric vehicle) may also exchange information wired or wirelessly using the network provided in the vehicle. For example, data may be exchanged using the network communication means provided in the vehicle, for example, Ethernet, Media Oriented Systems Transport (MOST), Flexray, Controller Area Network (CAN), Local Interconnect Network (LIN), Internet, LTE, 5G, Wi-Fi, Bluetooth, Near Field Communication (NFC), Zigbee, Radio Frequency (RF), or the like.

As set forth above, an apparatus and method according to an embodiment may enable a vehicle traveling on or off-road to cope with a wheel slip situation regardless of the type or characteristics of the terrain surface.

In an apparatus and method according to an embodiment, a vehicle traveling on or off-road may implement optimal traction performance depending on road surface conditions.

While the embodiments have been illustrated and described above, it should be apparent to those having ordinary skill in the art that modifications and variations could be made without departing from the scope of the present disclosure as defined by the appended claims.

What is claimed is:

1. An apparatus for controlling a slippage rate of a vehicle, the apparatus comprising:
    a vehicle information receiver configured to receive off-road driving information of the vehicle;
    a target slippage rate estimation unit configured to estimate a target slippage rate value and a wheel slippage rate section corresponding to a maximum traction coefficient, based on the off-road driving information; and
    a storage unit configured to store the target slippage rate value.

2. The apparatus of claim 1, wherein the target slippage rate estimation unit is configured to estimate the target slippage rate value based on the off-road driving information when the vehicle is accelerating.

3. The apparatus of claim 2, wherein the target slippage rate estimation unit is configured to determine whether the vehicle is in an accelerating state when a value obtained by subtracting a wheel speed from a vehicle speed is a positive number.

4. The apparatus of claim 1, wherein the target slippage rate estimation unit is configured to:
    repeatedly calculate a traction coefficient and a wheel slippage rate at a set time or a set interval using the off-road driving information collected by the vehicle information receiver; and
    estimate the wheel slippage rate section corresponding to the maximum traction coefficient from traction coefficient information corresponding to each wheel slippage rate.

5. The apparatus of claim 4, wherein the traction coefficient is a value calculated by dividing a wheel driving force that is calculated using the off-road driving information collected by the vehicle information receiver by wheel vertical force.

6. The apparatus of claim 4, wherein the wheel slippage rate is calculated using a wheel speed and a vehicle speed collected by the vehicle information receiver.

7. The apparatus of claim 1, wherein the storage unit is configured to store the target slippage rate value when the vehicle is in a decelerating state.

8. The apparatus of claim 1, wherein the storage unit is configured to store the target slippage rate value when brake is applied to the vehicle.

9. A method for controlling a slippage rate of a vehicle, the method comprising:
    receiving off-road driving information of the vehicle;
    estimating a target slippage rate value and a wheel slippage rate section corresponding to a maximum traction coefficient, based on the off-road driving information; and
    storing the target slippage rate value.

10. The method of claim 9, further comprising determining whether the vehicle is in a start-off state before estimating the target slippage rate value.

11. The method of claim 10, wherein estimating the target slippage rate value is performed when the vehicle is accelerating in the start-off state.

12. The method of claim 11, wherein determining whether the vehicle is in a start-off state comprises determining an acceleration of the vehicle when a vehicle speed is greater than a wheel speed.

13. The method of claim 9, wherein estimating the target slippage rate value comprises:
    calculating a traction coefficient and a wheel slippage rate repeatedly at set times or set intervals using the off-road driving information collected by the vehicle information receiver; and
    estimating the wheel slippage rate section corresponding to the maximum traction coefficient from traction coefficient information corresponding to each wheel slippage rate.

14. The method of claim 9, further comprising determining whether to store the target slippage rate value before storing the target slippage rate value.

15. The method of claim 14, wherein determining whether to store the target slippage rate value comprises storing the target slippage rate value when the vehicle is in a decelerating state.

16. The method of claim 14, wherein determining whether to store the target slippage rate value comprises storing the target slippage rate value when brakes are applied to the vehicle.

17. A non-transitory computer-readable storage medium having computer readable instructions stored thereon, the computer readable instructions, when executed by a processor, cause the processor to:
    receive off-road driving information of a vehicle;
    estimate a target slippage rate value and a wheel slippage rate section corresponding to a maximum traction coefficient based on the off-road driving information; and
    store the target slippage rate value.

* * * * *